(12) United States Patent
Froidurot et al.

(10) Patent No.: US 10,996,692 B2
(45) Date of Patent: May 4, 2021

(54) FLUIDIC DEVICE FOR SUPPLYING WORKING FLUID

(71) Applicant: Commissariat a l'energie atomique et aux energies alternatives, Paris (FR)

(72) Inventors: Laurent Froidurot, Grenoble (FR); Francois Sauzedde, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 202 days.

(21) Appl. No.: 16/392,730

(22) Filed: Apr. 24, 2019

(65) Prior Publication Data
US 2019/0326620 A1 Oct. 24, 2019

(30) Foreign Application Priority Data
Apr. 24, 2018 (FR) ..................... 18 53591

(51) Int. Cl.
*H01M 8/04089* (2016.01)
*G05D 16/16* (2006.01)
*H01M 8/04082* (2016.01)
*H01M 8/04746* (2016.01)

(52) U.S. Cl.
CPC ...... *G05D 16/166* (2013.01); *H01M 8/04089* (2013.01); *H01M 8/04201* (2013.01); *H01M 8/04753* (2013.01)

(58) Field of Classification Search
CPC .............. G05D 16/166; H01M 8/0489; H01M 8/04201; H01M 8/04753; Y02E 60/50
See application file for complete search history.

(56) References Cited

U.S. PATENT DOCUMENTS

| 2,986,157 A * | 5/1961 | Dollison ............. G05D 16/166 137/458 |
| 5,427,350 A | 6/1995 | Rinkewich |
| 2006/0127722 A1 * | 6/2006 | Nakajima ............ F16K 17/196 429/444 |

(Continued)

FOREIGN PATENT DOCUMENTS

EP 2 602 523 A1 6/2013

OTHER PUBLICATIONS

French Preliminary Search Report dated Jan. 29, 2019 in French Application 18 53591, filed on Apr. 24, 2018 (with English translation of categories of Cited Documents and Written Opinion).

*Primary Examiner* — Michael L Dignan
(74) *Attorney, Agent, or Firm* — Oblon, McClelland, Maier & Neustadt, L.L.P.

(57) ABSTRACT

A fluidic device for supplying working fluid includes: a fluid line for the flow of the working fluid; a pressure regulator adapted to reduce the pressure of the working fluid from the upstream pressure to a downstream pressure; a valve adapted to be pressure-controlled for opening or closing, depending on whether a pressure exerted on its valve head is substantially equal to the upstream pressure or to the downstream pressure; a distributor including a first opening connected to an upstream side of the pressure regulator, a second opening downstream of the pressure regulator, and a control opening connected to the valve head. The distributor is adapted to cause the opening or closing of the valve, depending on whether the control opening is connected to the first opening or to the second opening.

10 Claims, 3 Drawing Sheets

(56) References Cited

U.S. PATENT DOCUMENTS

| | | |
|---|---|---|
| 2007/0166577 A1 | 7/2007 | Inai et al. |
| 2009/0053567 A1 | 2/2009 | Katano |
| 2010/0051842 A1* | 3/2010 | Mertens .................. F02M 26/57 |
| | | 251/129.08 |
| 2010/0068580 A1* | 3/2010 | Osada .................. H01M 8/0438 |
| | | 429/515 |
| 2013/0183601 A1* | 7/2013 | Nomichi ............ G05D 16/2013 |
| | | 429/446 |

* cited by examiner

FLUIDIC DEVICE FOR SUPPLYING WORKING FLUID

TECHNICAL FIELD

The field of the invention is that of fluidic devices comprising a pressure regulator and a valve positioned in series on a fluid line. Such fluidic devices may be used for receiving the working fluid at an upstream pressure and supplying, that is to say delivering, the working fluid at a downstream pressure which is lower than the upstream pressure. The invention may be applied in numerous technical fields, notably in the field of electrochemical systems comprising a fuel cell supplied with a working fluid, for example hydrogen and/or oxygen, initially stored under pressure.

PRIOR ART

In numerous technical fields, it is necessary to use a fluidic supply device adapted to receive a working fluid at an upstream pressure and to deliver the working fluid on request at a downstream pressure which is lower than the upstream pressure. Such a supply device then comprises a fluid line for the flow of the working fluid, on which a valve and a pressure regulator are positioned in series.

This is the case, notably, in electrochemical systems comprising a fuel cell supplied, for example, with a working fluid that is initially stored under pressure. A supply device then usually connects the pressurized tank to an inlet of the fuel cell. By way of example, the tank may store hydrogen at a pressure of several tens of bars, and the fuel cell may need to be supplied with hydrogen at a pressure of a few bars or thereabouts. A pressure regulator is then required on the fluid supply line, together with a valve for allowing or preventing the flow of the working fluid.

Control of the opening/closing of the valve may conventionally be provided in various ways. Thus the valve may be electrically controlled, using a solenoid for example, or may be pressure-controlled, using compressed air for example.

However, there is need to provide such a fluid supply device having a lower energy cost associated with the valve control.

SUMMARY OF THE INVENTION

The object of the invention is to overcome at least some of the drawbacks of the prior art, and more particularly to propose a fluidic device for supplying a working fluid in which the valve control has a lower energy cost.

For this purpose, the invention proposes a fluidic device for supplying working fluid, comprising:
- a fluid line for the flow of the working fluid, comprising an inlet designed to receive the working fluid at an upstream pressure $P_{in}$;
- a pressure regulator, positioned on the fluid line, adapted to reduce the pressure of the working fluid from the upstream pressure to a downstream pressure $P_{out}$;
- a valve, positioned on the fluid line upstream or downstream of the pressure regulator, comprising a valve head adapted to occupy a valve open position and a valve closed position.

According to the invention, the valve is adapted to be pressure-controlled for opening or closing, depending on whether a pressure exerted on the valve head is substantially equal to the upstream pressure $P_{in}$ or to the downstream pressure $P_{out}$.

Additionally, the fluidic device comprises a distributor:
- comprising a first opening connected to the fluid line upstream of the pressure regulator, a second opening connected to the fluid line downstream of the pressure regulator, and a third opening, called the control opening, connected to the valve head,
- adapted to cause the valve to be opened or closed, depending on whether the control opening is connected to the first or to the second opening.

Some preferred, but non-limiting, features of this fluid supply device are as follows.

The distributor may be configured so that the valve is closed when the working fluid exerts a pressure called the closing pressure, substantially equal to the pressure of the working fluid in the fluid line at the valve inlet, on the valve head.

The valve may be positioned downstream of the pressure regulator, and may be adapted to be open when the working fluid exerts a pressure substantially equal to the upstream pressure $P_{in}$ on the valve head, and to be closed when the working fluid exerts a pressure substantially equal to the downstream pressure $P_{out}$ on the valve head. The distributor may then have:
- a valve open configuration in which the control opening is connected to the first opening, thus putting the valve head into communication with the working fluid at a pressure substantially equal to the upstream pressure $P_{in}$, and
- a valve closing configuration in which the control opening is connected to the second opening, thus putting the valve head into communication with the working fluid at a pressure substantially equal to the downstream pressure $P_{out}$.

The valve may be positioned upstream of the pressure regulator, and may be adapted to be open when the working fluid exerts a pressure substantially equal to the downstream pressure $P_{out}$ on the valve head, and to be closed when the working fluid exerts a pressure substantially equal to the upstream pressure $P_{in}$ on the valve head. The distributor may then have:
- a valve open configuration in which the control opening is connected to the second opening, thus putting the valve head into communication with the working fluid at a pressure substantially equal to the downstream pressure $P_{out}$, and
- a valve closing configuration in which the control opening is connected to the first opening, thus putting the valve head into communication with the working fluid at a pressure substantially equal to the upstream pressure $P_{in}$.

The valve may comprise an intermediate chamber located between the valve head and an internal passage communicating with the fluid line, and traversed in a sealed way by a rod connecting the valve head to a shutter of the internal passage, the intermediate chamber being set at a pressure substantially equal to the closing pressure.

The intermediate chamber may be connected to a part of said fluid line in which the working fluid is at the closing pressure.

The distributor may be electrically controlled.

The invention also relates to an electrochemical system comprising:
- a tank for storing a working fluid at a pressure greater than or equal to the upstream pressure $P_{in}$;
- a fuel cell, comprising at least one inlet manifold adapted to provide the flow of working fluid into the fuel cell;

at least one fluid supply device according to any of the preceding characteristics, connecting the tank to the inlet manifold, the working fluid being hydrogen or oxygen.

The electrochemical system may comprise at least one supplementary valve:
comprising a valve head adapted to occupy a valve open position and a valve closed position, and adapted to be pressure-controlled for opening or closing, depending on whether a pressure exerted on the valve head is substantially equal to the upstream pressure $P_{in}$ or to the downstream pressure $P_{out}$, and
pressure-controlled by said distributor of said fluid supply device, or by a supplementary distributor comprising a first opening connected to said fluid line upstream of said pressure regulator, a second opening connected to said fluid line downstream of said pressure regulator, and a third opening, called the control opening, connected to the supplementary valve head, and adapted to cause the supplementary valve to open or close, depending on whether its control opening is connected to its first opening or to its second opening.

The working fluid may be hydrogen. The fuel cell may comprise an anode inlet manifold designed to receive the working fluid, and a cathode inlet manifold designed to receive air. At least one air supply valve may be positioned on an air fluid supply line connected to the cathode inlet manifold, the air supply valve:
comprising a valve head adapted to occupy a valve open position and a valve closed position, and adapted to be pressure-controlled for opening or closing, depending on whether a pressure exerted on its valve head is substantially equal to the upstream pressure $P_{in}$ or to the downstream pressure $P_{out}$;
being pressure-controlled by said distributor of said fluid supply device, or by a supplementary distributor controlling the air supply valve, comprising a first opening connected to said fluid line upstream of said pressure regulator, a second opening connected to said fluid line downstream of said pressure regulator, and a third opening, called the control opening, connected to the air supply valve head, and adapted to cause the air supply valve to open or close, depending on whether its control opening is connected to its first opening or to its second opening.

BRIEF DESCRIPTION OF THE DRAWINGS

Other aspects, objects, advantages and characteristics of the invention will be more readily apparent from a perusal of the following detailed description of preferred embodiments of the invention, provided by way of non-limiting example with reference to the attached drawings, in which.

DETAILED DESCRIPTION OF PARTICULAR EMBODIMENTS

On the figures and in the following description, the same references represent identical or similar elements. Additionally, in order to enhance the clarity of the figures, the different elements are not shown to scale. Furthermore, the different embodiments and variants are not mutually exclusive and may be combined with one another. Unless specified otherwise, the terms "substantially", "approximately", and "of the order of" signify a tolerance of 10%, or preferably 5%. Furthermore, the expression "comprising a" is to be interpreted as "comprising at least one", unless specified otherwise.

The invention relates in a general way to a fluid supply device adapted to receive a working fluid at an upstream pressure $P_{in}$ and to deliver the working fluid at a downstream pressure $P_{out}$. The supply device thus comprises a fluid line for the flow of the working fluid, on which a pressure regulator and a valve are positioned in series. The valve can be pressure-controlled by means of a distributor whose control fluid is the working fluid present in the fluid line. Furthermore, the working fluid may be a gas or a liquid.

Figure 1A:
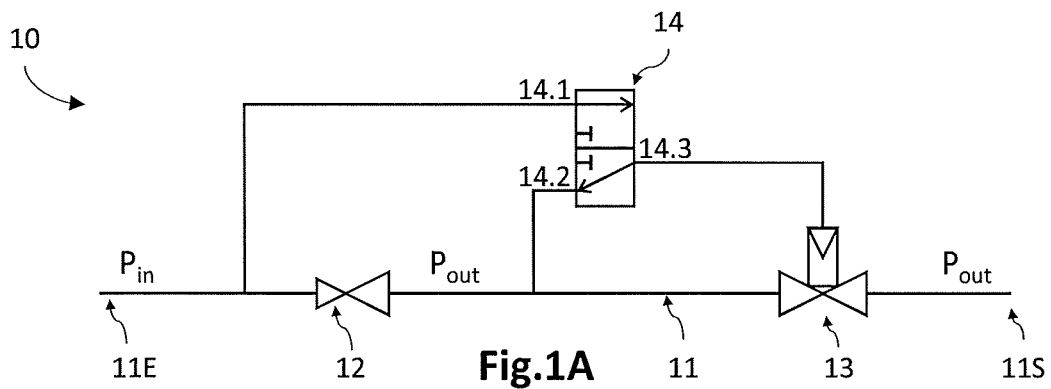
FIGS. 1A and 1B are schematic views of a fluid supply device according to a first embodiment, in which the valve is positioned downstream of the pressure regulator, in a closed configuration (FIG. 1A) and in an open configuration (FIG. 1B)
Figure 1B:
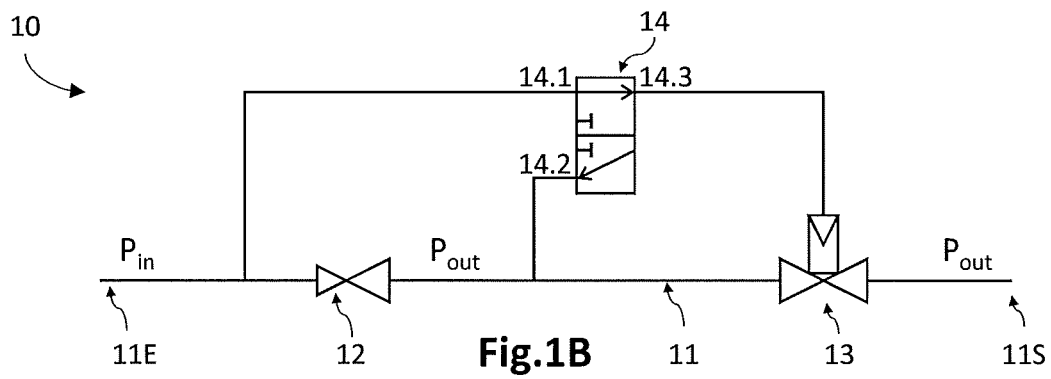

FIGS. 1A and 1B show in a schematic manner a fluid supply device 10 according to a first embodiment, in which the valve 13 is positioned downstream of the pressure regulator 12, in a closed configuration (FIG. 1A) and in an open configuration (FIG. 1B).

The fluid line 11 comprises an inlet 11E designed to receive working fluid at a non-zero upstream pressure $P_{in}$. The inlet 11E may be connected to a source of working fluid under pressure, such a storage tank (not shown). The upstream pressure $P_{in}$ may be equal to several bars, or possibly several tens or hundreds of bars. The fluid line 11 comprises a supply outlet 11S designed to deliver the working fluid at a downstream pressure $P_{out}$, depending on whether the valve 13 is open or closed. The supply device 10 may comprise the source of working fluid adapted to deliver the working fluid at the upstream pressure $P_{in}$ to the inlet 11E, or may be connected to such a source.

As a general rule, in the following description, the working fluid is said to be equal, or substantially equal, to $P_{in}$ or to $P_{out}$, depending on whether the location is upstream or downstream of the pressure regulator 12, subject to any pressure drops which may or may not be negligible. In other words, in the following description, the pressure drops between the pressure regulator and the valve, as well as those that may be present in the passages connecting the distributor to the fluid line and to the valve, are disregarded.

The pressure regulator 12 is positioned on the fluid line 11, and is adapted to reduce the pressure of the working fluid from the upstream pressure $P_{in}$ to the downstream pressure $P_{out}$. In general terms, a pressure regulator 12 is a member for controlling the downstream pressure $P_{out}$; that is to say, it is adapted to lower the pressure of the working fluid passing through it to a delivery value $P_{out}$. It may be in a closed position when the downstream pressure $P_{out}$ is greater than the upstream pressure. Additionally, the pressure regulator may or may not control the value of the molar flow rate of the working fluid, for example by making the value of the molar flow rate dependent on the downstream pressure $P_{out}$.

Figure 3A:
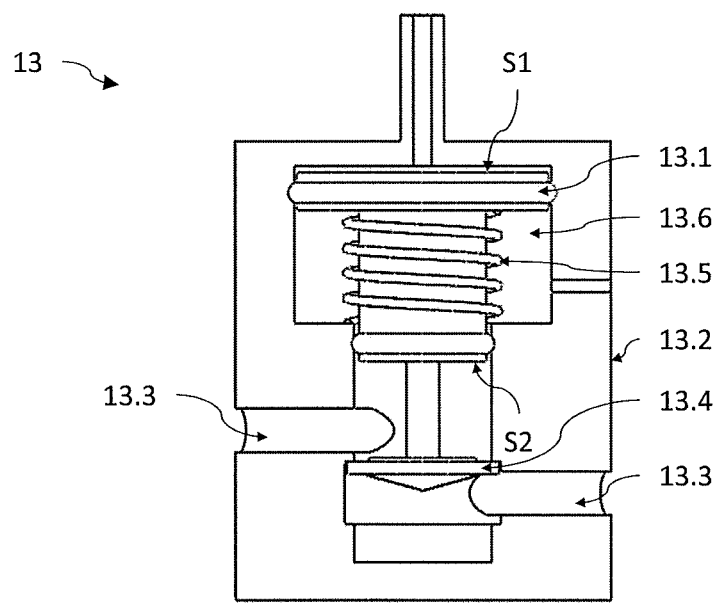
FIGS. 3A and 3B are schematic views, in cross section, of an example of a pressure-controllable valve of a fluid supply device according to the first embodiment, whose intermediate chamber is set at a pressure equal to the closing pressure $P_{out}$, in a closed configuration (FIG. 3A) and in an open configuration (FIG. 3B)
Figure 3B:
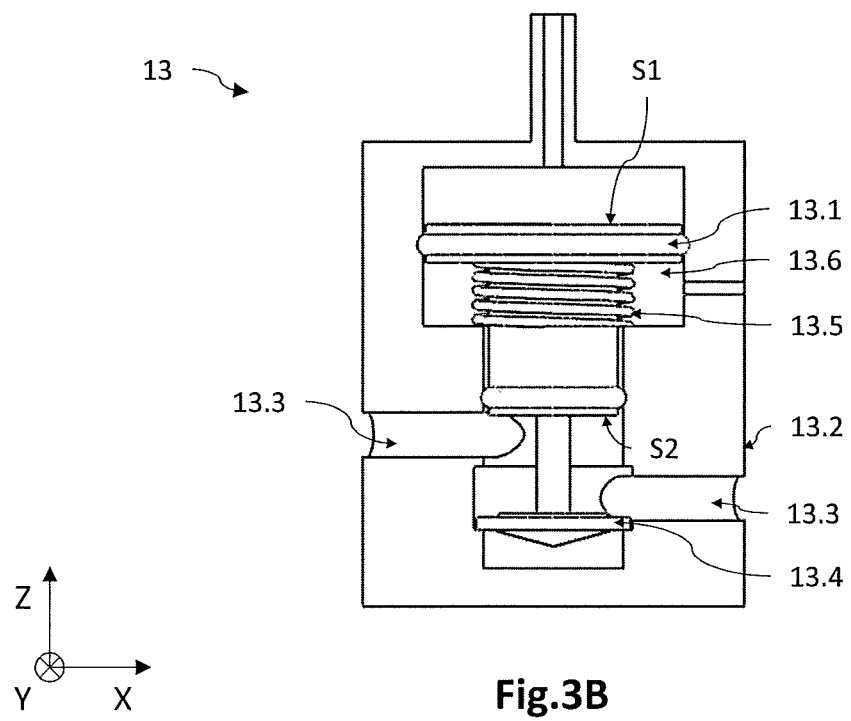

The valve 13 is positioned on the fluid line 11, in this case downstream of the pressure regulator 12. It is adapted to allow or block the flow of the working fluid between the inlet 11E and the outlet 11S of the supply device 10. For this purpose, it comprises, in a conventional way, as illustrated in FIGS. 3A and 3B, a valve head 13.1, a valve body 13.2, an internal passage 13.3 communicating with the fluid line 11, and a shutter 13.4 adapted to block or leave open the internal passage 13.3. The valve head 13.1 is movable by displacement relative to the valve body 13.2, causing a displacement of the shutter 13.4 between an opening position and a closing position, thereby allowing or blocking the flow of the working fluid in the internal passage 13.3 and therefore in the fluid line 11.

The valve 13 is pressure-controlled; that is to say, it is adapted to be controlled for opening and closing by a pressure exerted by a control fluid on the valve head 13.1. In the context of the invention, the control fluid is the working fluid, whose pressure may be substantially equal to the pressure $P_{in}$ or $P_{out}$, subject to any pressure drops, as mentioned above. Thus the valve 13 is adapted to be pressure-controlled for opening or closing, depending on whether the working fluid exerts a pressure substantially equal to $P_{in}$ or $P_{out}$ on the valve head 13.1 As a general rule, the valve 13 may be closed when the valve head 13.1 is subject to a pressure substantially equal to $P_{in}$, or when it is subject to a pressure substantially equal to $P_{out}$. In this example, the valve 13 is closed when the working fluid exerts a pressure substantially equal to the downstream pressure $P_{out}$ on the valve head 13.1. It is open when the working fluid exerts a pressure substantially equal to the upstream pressure $P_{in}$ on the valve head 13.1.

The distributor 14 provides the control of the valve 13, that is to say the operation or actuation of the valve, using a control fluid which is the working fluid present in the fluid line 11, in response to its actuation by a user. It comprises at least three openings 14.1, 14.2, 14.3, and may occupy at least two positions, called the opening position and the closing position. The distributor is then at least a 3/2 distributor (meaning three openings and two positions). The distributor 14 is advantageously electrically actuated and galvanically isolated, particularly in the case where the working fluid is flammable in contact with air, as is the case with hydrogen. Its actuation may then require a low electrical power, depending, notably, on the application of the supply device 10. However, other types of actuation may be used. The distributor 14 has a configuration for closing the valve 13 and a configuration for opening the valve 13, which are described below.

The first opening 14.1 is connected to the fluid line 11 upstream of the pressure regulator 12, and thus receives the working fluid at a pressure substantially equal to the upstream pressure $P_{in}$. The second opening 14.2 is connected to the fluid line 11 downstream of the pressure regulator 12, and thus receives the working fluid at a pressure substantially equal to the downstream pressure $P_{out}$. The term "connected" is taken to mean "fluidly connected", that is to say in fluid communication. The third opening 14.3, called the control opening, is connected to the valve head 13.1, and can thus put the latter into communication with the working fluid at a pressure substantially equal to $P_{in}$ or $P_{out}$.

As a general rule, the supply device 10 may be normally closed or normally open. The term "normally" refers to the state of the supply device 10 when it is inactive, that is to say when the distributor 14 is not actuated or activated by a user. The inlet 11E of the fluid line 11 receives the working fluid at the upstream pressure $P_{in}$.

When the supply device 10 is normally closed, the distributor 14 has a valve closing configuration, and therefore the valve 13 is closed. In this case, the working fluid does not flow in the fluid line 11. The valve 13 may have two configurations, depending on whether it can be actuated to open by overpressure at an opening pressure substantially equal to the upstream pressure $P_{in}$, or by underpressure at an opening pressure substantially equal to the downstream pressure $P_{out}$:

The valve 13 may be actuated for opening by overpressure at an opening pressure substantially equal to $P_{in}$ in this case.

It may thus be closed when its valve head is subject to a pressure lower than an opening pressure, for example when it is subject to a pressure substantially equal to the downstream pressure $P_{out}$, or to atmospheric pressure. For this purpose, the distributor 14 has the closing configuration in which the control opening 14.3 is connected to the second opening 14.2.

It is actuated for opening by overpressure when its valve head is subject to the opening pressure, which in this case is substantially equal to the upstream pressure $P_{in}$. For this purpose, the distributor 14 has the opening configuration in which the control opening 14.3 is connected to the first opening 14.1.

In a variant, the valve 13 may be actuated for opening by underpressure at an opening pressure substantially equal to $P_{out}$ in this case.

It may thus be closed when its valve head is subject to a pressure greater than an opening pressure, for example when it is subject to a pressure substantially equal to the upstream pressure $P_{in}$. For this purpose, the distributor 14 has the closing configuration in which the control opening 14.3 is connected to the first opening 14.1.

It is actuated for opening by underpressure when its valve head is subject to the opening pressure, which in this case is substantially equal to the downstream pressure $P_{out}$. For this purpose, the distributor 14 has the opening configuration in which the control opening 14.3 is connected to the second opening 14.2.

In a variant, the supply device 10 may be normally open when the distributor 14 is not activated or actuated by a user. The distributor 14 then has a valve opening configuration, and therefore the valve 13 is open. The working fluid can then flow in the fluid line 11. Here also, the valve may have two configurations, depending on whether it is actuated for closing by overpressure at a closing pressure substantially equal to the upstream pressure $P_{in}$, or by underpressure at a closing pressure substantially equal to the downstream pressure $P_{out}$:

The valve 13 may be actuated for closing by overpressure at a closing pressure substantially equal to $P_{in}$ in this case.

It is thus open when its valve head is subject to a pressure lower than the closing pressure, for example when it is subject to a pressure substantially equal to the downstream pressure $P_{out}$, or to atmospheric pressure. For this purpose, the distributor 14 has the opening configuration in which the control opening 14.3 is connected to the second opening 14.2.

It is actuated for closing by overpressure when its valve head is subject to the closing pressure, which in this case is substantially equal to the upstream pressure $P_{in}$. For this purpose, the distributor 14 has the closing configuration in which the control opening 14.3 is connected to the first opening 14.1.

In a variant, the valve 13 may be actuated for closing by underpressure at a closing pressure substantially equal to $P_{out}$ in this case.

It is thus open when its valve head is subject to a pressure greater than the closing pressure, for example when it is subject to a pressure substantially equal to the upstream pressure $P_{in}$. For this purpose, the distributor 14 has the opening configuration in which the control opening 14.3 is connected to the first opening 14.1.

It is actuated for closing by underpressure when its valve head is subject to the closing pressure, substantially equal to the downstream pressure $P_{out}$ in this case. For this purpose, the distributor 14 has the closing configuration in which the control opening 14.3 is connected to the second opening 14.2.

In the example illustrated in FIGS. 1A and 1B, the supply device 10 is normally closed, and the valve 13 is configured to be closed when its valve head is subject to a pressure substantially equal to the downstream pressure $P_{out}$. In other words, the valve 13 in this case is closed when the distributor 14 is not activated, and is actuated for opening by overpressure at an opening pressure substantially equal to $P_{in}$ in this case. The distributor 14 then has a valve closing configuration at rest, in which the control opening 14.3 is connected to the second opening 14.2. When a user actuates the distributor 14, it then changes to a valve opening configuration, which then causes the valve 13 to open.

The operation of the supply device 10 will now be described. FIG. 1A shows the supply device 10 in its normally closed state; that is to say, the distributor 14 is not actuated or activated by a user, while the working fluid is present at the inlet 11E at the upstream pressure $P_{in}$. The valve 13 is closed, so that the working fluid does not flow at the outlet 11S of the fluid line 11. The distributor 14 has the closing configuration, in which the control opening 14.3 is connected to the second opening 14.2, thus putting the valve head 13.1 into fluid communication with the working fluid at a pressure substantially equal to the downstream pressure $P_{out}$. Since the valve is here configured to be closed when the valve head 13.1 is subject to a pressure substantially equal to $P_{out}$, the valve head 13.1 is here in a position in which the shutter 13.4 closes the internal passage 13.3 and therefore blocks the flow of the working fluid in the fluid line 11.

FIG. 1B shows the supply device 10 in its activated state. The distributor 14 is then actuated by a user, so that it then changes to the valve opening configuration, in which the control opening 14.3 is connected to the first opening 14.1, thus putting the valve head 13.1 into fluid communication with the working fluid at a pressure substantially equal to the upstream pressure $P_{in}$. Since the valve 13 can be actuated for opening by overpressure at an opening pressure which is here substantially equal to $P_{in}$, the valve head 13.1 is then displaced and the shutter 13.4 occupies an opening position, allowing the working fluid to flow in the internal passage 13.3 and therefore in the fluid line 11.

Additionally, when the distributor 14 returns to a closing configuration, the control opening 14.3 is then reconnected to the second opening 14.2. A transient condition is present, in which the working fluid at the pressure $P_{in}$, located in a passage connecting the control opening 14.3 to the valve head 13.1, is expanded to the pressure $P_{out}$, and reaches the fluid line 11 via the second opening 14.2.

Thus the supply device 10 has a particularly low energy cost associated with the control of the valve 13, notably by comparison with solenoid valves and compressed air valves, because use is made of the working fluid, instead of a dedicated control fluid, which exhibits a pressure difference between the upstream pressure $P_{in}$ and the downstream pressure $P_{out}$. The control is then provided by a distributor, which then directs the working fluid at upstream pressure $P_{in}$ or at downstream pressure $P_{out}$ towards the valve head 13.1, depending on whether it is desired to open or close the valve 13. The actuation of the distributor 14 may also have a low energy cost, notably when it is electrically actuated.

The energy cost of operating the supply device 10 is also reduced by the fact that, when the distributor 14 returns to the closing configuration, the working fluid contained in the passage connecting the control opening 14.3 to the valve head 13.1 is put back into communication with the fluid line 11 and is introduced into it by expansion. Thus there is no loss of the working fluid when the distributor 14 changes from one configuration to the other.

The supply device 10 also has a high degree of reliability because the control of the valve 13 uses a distributor 14, instead of the compressor used in the example of compressed air valves. It also has smaller overall dimensions and low weight.

It also makes it possible to avoid the safety risks that are present, for example, in compressed air pneumatic valves, since there is no risk of leakage of a dedicated control fluid into the fluid line, as the control fluid in this case is the working fluid present in the fluid line.

Figure 2A:
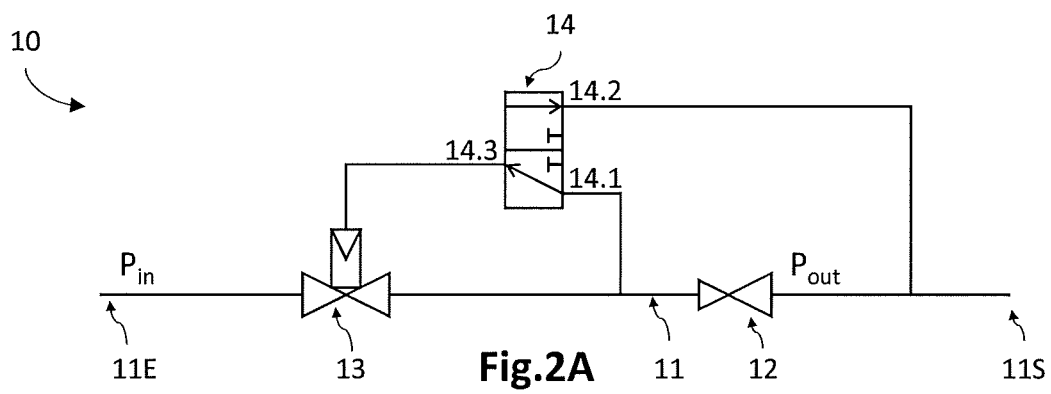
FIGS. 2A and 2B are schematic views of a fluid supply device according to a second embodiment, in which the valve is positioned upstream of the pressure regulator, in a closed configuration (FIG. 2A) and in an open configuration (FIG. 2B)
Figure 2B:
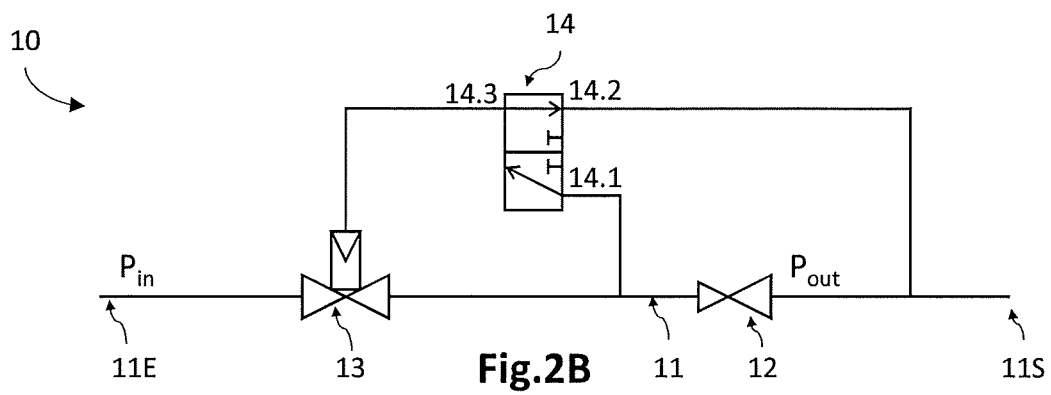

FIGS. 2A and 2B show in a schematic manner a fluid supply device 10 according to a second embodiment, in which the valve 13 is positioned upstream of the pressure regulator 12, in a closed configuration (FIG. 2A) and in an open configuration (FIG. 2B).

The supply device 10 differs from that shown in FIGS. 1A and 1B notably by the position of the valve 13 relative to the pressure regulator 12. Additionally, in this example, the valve 13 is also closed when the distributor 14 is not actuated by a user. Furthermore, it may be actuated for opening by underpressure at an opening pressure which in this case is substantially equal to the downstream pressure $P_{out}$. In other words, it is actuated for opening by underpressure when its valve head 13.1 is subject to an opening pressure of the working fluid, which in this case is substantially equal to the downstream pressure $P_{out}$.

FIG. 2A shows the supply device 10 in its normally closed state; that is to say, the distributor 14 is not actuated or activated by a user. The valve 13 is closed, so that the working fluid does not flow at the outlet 11S of the fluid line 11. The distributor 14 then has the closing configuration, in which the control opening 14.3 is connected to the first opening 14.1, thus putting the valve head 13.1 into fluid communication with the working fluid at a pressure substantially equal to the upstream pressure $P_{in}$. Since the valve is here configured to be closed when the valve head 13.1 is subject to a pressure substantially equal to $P_{in}$, the valve head 13.1 here occupies a position in which the shutter 13.4 closes the internal passage 13.3 and therefore blocks the flow of the working fluid in the fluid line 11.

FIG. 2B shows the supply device 10 in its activated state. The distributor 14 is then actuated by a user, so that it changes to the valve opening configuration, in which the control opening 14.3 is connected to the second opening 14.2, thus putting the valve head 13.1 into fluid communication with the working fluid at a pressure substantially equal to the downstream pressure $P_{out}$. Since the valve 13 can be actuated for opening by underpressure at an opening pressure which is here substantially equal to $P_{out}$, the valve head 13.1 is then displaced and the shutter 13.4 occupies an opening position, allowing the working fluid to flow in the internal passage 13.3 and therefore in the fluid line 11.

Additionally, when the distributor 14 returns to a closing configuration, the control opening 14.3 is then reconnected to the first opening 14.1. A transient condition is present, in which the working fluid at the pressure $P_{out}$, located in the passage connecting the control opening 14.3 to the valve head 13.1, is compressed to the pressure $P_{in}$ by the working fluid in the fluid line between the valve 13 and the pressure regulator 12, via the first opening 14.1.

FIGS. 3A and 3B show an example of a valve 13 of the fluidic device according to the embodiment, in a closed configuration (FIG. 3A) and in an open configuration (FIG. 3B). The valve 13 is here similar or identical to that shown in FIGS. 1A and 1B: it is closed when the distributor 14 is not activated by a user, and can be actuated for opening by overpressure at an opening pressure which is here substantially equal to the upstream pressure $P_{in}$. In other words, it is actuated for opening when the working fluid applies an opening pressure, substantially equal to the upstream pressure $P_{in}$, and greater than the resting pressure $P_{out}$, to a valve head 13.1.

The valve 13 comprises a valve head 13.1, a body 13.2 in which is arranged an internal passage 13.3 that extends between an inlet and an outlet and forms part of the fluid line 11, and a shutter 13.4 fixed to the valve head 13.1 by a rod. The opening and closing configurations of the valve 13 are dependent on the position of the valve head 13.1, and therefore of the shutter 13.4 in the internal passage 13.3, the valve head being fitted so as to be movable by displacement relative to the body 13.2. The valve head 13.1 is constrained in its displacement by a return member 13.5, such as a spring, located in an intermediate chamber 13.6. The rod passes in a sealed manner through the intermediate chamber 13.6. Additionally, the valve head 13.1 is connected to the control opening 14.3 of the distributor 14 by a sealed passage, so that the valve head 13.1 is in contact with the working fluid, which can exert a pressure substantially equal to the upstream pressure $P_{in}$ or a pressure substantially equal to the downstream pressure $P_{out}$ on the valve head 13.1. As mentioned above, the expression "pressure substantially equal to a given value" is here taken to mean that the pressure is equal to this value, subject to any pressure drops.

As mentioned above, the valve 13 is here closed when the distributor 14 is not activated by a user (the working fluid exerts a pressure substantially equal to the downstream pressure $P_{out}$, lower than the opening pressure, $P_{in}$ on the valve head 13.1). It is actuated for opening by overpressure when the working fluid exerts the opening pressure, here substantially equal to the upstream pressure $P_{in}$, on the valve head 13.1.

Thus, as shown in FIG. 3A, the valve 13 is closed when it is not actuated for opening by the distributor 14. Thus the control opening 14.3 is connected to the second opening 14.2, so that the working fluid exerts a pressure substantially equal to the downstream pressure $P_{out}$, thus lower than the opening pressure $P_{in}$, on the valve head 13.1. The return member 13.5 therefore pushes the valve head 13.1 back in the direction +Z, causing the internal passage 13.3 to be shut off (with a sealed contact between the shutter 13.4 and a valve seat) and therefore causing the flow of the working fluid in the fluid line 11 to be blocked.

As shown in FIG. 3B, when the valve 13 is actuated for opening by the distributor 14, the control opening 14.3 is connected to the first opening 14.1, so that the working fluid exerts the opening pressure, here substantially equal to the upstream pressure $P_{in}$, on the valve head 13.1. The valve head 13.1 is therefore displaced in the direction –Z, causing the separation of the shutter 13.4 from the valve seat, and then enabling the working fluid to flow in the internal passage 13.3 and therefore in the fluid line 11.

However, the inventors have found that, after an opening phase of the valve 13, and when the distributor 14 causes the valve 13 to close, the sealed closure of the shutter 13.4 against the seat may be imperfect. This is the case, notably, when the intermediate chamber 13.6:

on the one hand, is subject to a pressure $P_{interm}$ different from the closing pressure, being, for example, subject to a pressure lower than the downstream pressure $P_{out}$; and on the other hand, is subject to a first force F1, orientated towards the direction –Z, and substantially equal to $P_{out} \times S1$, where S1 is the surface area of the valve head 13.1 with which the working fluid at the pressure $P_{out}$ is in contact, and a second force F2, orientated towards an opposite direction, in this case the direction +Z, and substantially equal to $P_{out} \times S2$, where S2 is a surface area with which the working fluid present in the internal passage 13.3 at the pressure $P_{out}$ is in contact, S2 being different from S1 and smaller than S1 in this case.

Thus the inventors have found that the imperfect sealed closure may be avoided when the intermediate chamber 13.6 is brought to a pressure $P_{interm}$ substantially equal to the closing pressure, with a tolerance of 10%, and preferably 5%, that is to say equal to the downstream pressure $P_{out}$ in this case. The intermediate chamber 13.6 may be connected to the fluid line 11 downstream of the pressure regulator 12, so that it is filled with the working fluid at the pressure $P_{out}$. It may be filled with an inert fluid, for example nitrogen. In the context of an application of the valve 13 to a cathode line of a fuel cell supplied with air, the intermediate chamber 13.6 may be connected to the cathode outlet of the fuel cell, whose outgoing fluid is then air which is oxygen-depleted air, and therefore substantially inert.

In this example, the supply device 1 is normally closed, and the valve 13 may be actuated for opening by overpressure at an opening pressure substantially equal to $P_{in}$ in this case. In other words, the valve 13 is actuated for closing when the working fluid applies a pressure lower than the opening pressure $P_{in}$, in this case a pressure substantially equal to the downstream pressure $P_{out}$, to the valve head). In a variant, the valve 13 may be actuated for opening by underpressure at an opening pressure substantially equal to $P_{out}$ in this case. In other words, the valve 13 is actuated for closing when the valve head is subject to a pressure greater than the opening pressure $P_{out}$, which is here a pressure substantially equal to the upstream pressure $P_{in}$, as is the case in the example shown in FIGS. 2A to 2B. In this case, the intermediate chamber 13.6 is preferably brought to a pressure substantially equal to the closing pressure, which is here the upstream pressure $P_{in}$.

Figure 4A:
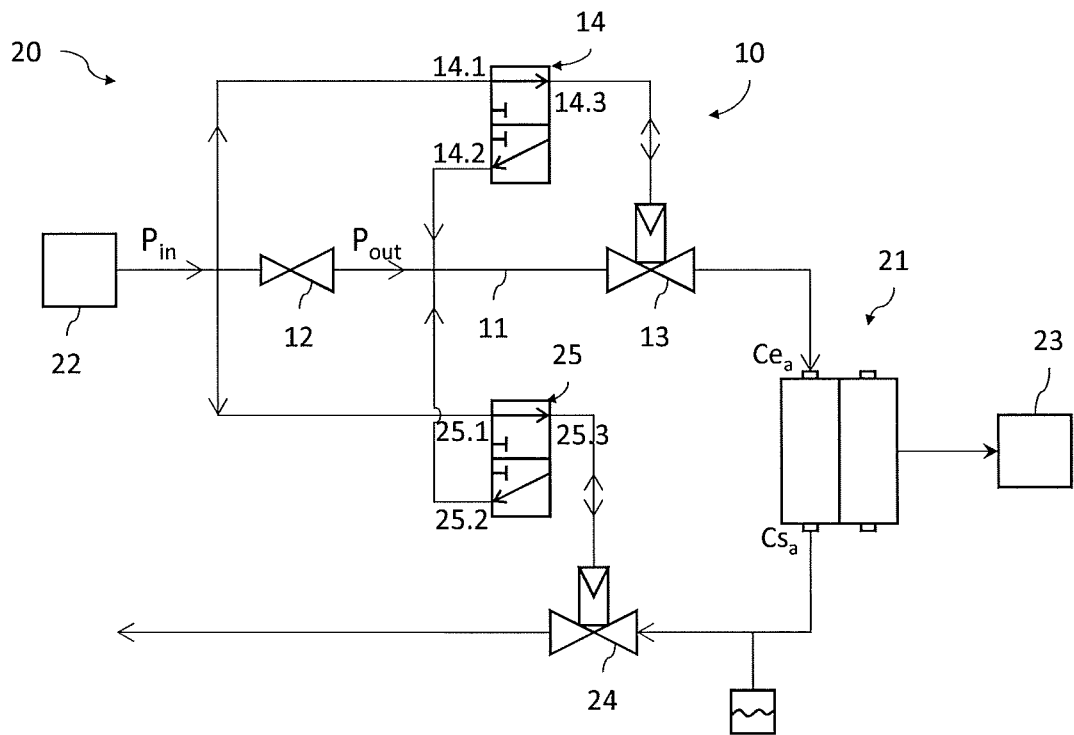
FIG. 4A is a schematic view of an example of an electrochemical system of the fuel cell type comprising a fluid supply device according to one embodiment, which also provides control of a supplementary valve.

FIG. 4A shows an example of the application of the fluid supply device 10 according to the first embodiment in the context of an electrochemical system 20 having a fuel cell 21. In this example, the fuel cell 21 is supplied with hydrogen at the anode. The anode side of the fuel cell 21 will be considered here in particular, the fuel cell then being supplied with hydrogen. However, the invention is applicable to the cathode side of the fuel cell 21, the working fluid then being oxygen which is initially stored under pressure. The electrochemical system 20 is shown here in a simplified manner, and may comprise, in addition to the illustrated elements, supplementary fluid and/or thermal and/or electrical members (not shown).

The electrochemical system 20 comprises a fluidic device 10 for supplying the fuel cell 21, the working fluid here being hydrogen. It advantageously comprises at least one supplementary valve 24, in this case a purge valve, pressure-controllable by a supplementary distributor 25 whose control fluid is the working fluid flowing in the fluid line 11.

The electrochemical system 20 comprises a tank 22 for storing the pressurized working fluid, in this case hydrogen, at a pressure greater than or equal to the upstream pressure $P_{in}$, for example several bars or tens of bars. The tank 22 supplies the anode side of the fuel cell 21 via the fluid supply device 10.

The fluid supply device 10 connects the hydrogen tank 22 to an anode inlet manifold $Ce_a$ of the fuel cell 21. It is identical or similar to that described previously with reference to FIGS. 1A and 1B. Thus it comprises a fluid line 11 on which is positioned a pressure regulator 12 at the outlet of the tank 22, and a valve 13 between the holder 12 and the anode inlet manifold $Ce_a$. The valve 13 is controlled by the distributor 14 as described previously.

The fuel cell 21 comprises at least one electrochemical cell, in this case a stack of electrochemical cells (not shown). Each cell comprises an anode and a cathode, separated from one another by an electrolytic membrane, this combination forming a membrane-electrode assembly (MEA). The anode, the membrane and the cathode are conventional elements known to those skilled in the art, and are therefore not described in detail. Each assembly is separated from those of the adjacent cells by bipolar plates, adapted to bring the reactive species to the anode of a first cell on the one hand, and to the cathode of an adjacent cell on the other hand, and to remove the products resulting from the electrochemical reactions and the non-reactive species, and also to transmit the electric current between the cells. It may also provide for the flow of a heat transfer fluid between the cells to enable the resulting heat to be removed.

The fuel cell 21 comprises two separate inlet manifolds, one being the anode manifold $Ce_a$ and the other being the cathode manifold $Ce_c$, designed for the fluid injection of the supply gases into the cells, and two separate outlet manifolds $Cs_a$, $Cs_c$ for removing the unreacted supply gases and non-reactive species from the fuel cell 21. Thus hydrogen is injected into the fuel cell 21 by the anode inlet manifold $Ce_a$, which guides it to the electrochemical cells. The unreacted hydrogen and non-reactive species are then removed by the corresponding outlet manifold $Cs_a$. The fuel cell 21 is also connected to an electrical load 23 and supplies it with electrical energy.

Thus, in operation, the fluid supply device 10 receives hydrogen from the tank 22 at an upstream pressure, equal to $P_{in}$ in this case. The hydrogen flows in the fluid line 11, and passes through the pressure regulator 12 which reduces the pressure to the downstream pressure $P_{out}$. Some of the hydrogen also reaches the first opening 14.1 of the distributor 14. As described above, since the supply device 10 is normally closed and the valve 13 can be actuated for opening by overpressure at the opening pressure $P_{in}$, the distributor 14, when at rest, has a valve closing configuration such that the control opening 14.3 is connected to the second opening 14.2. The valve head 13.1 is then subject to a pressure lower than the opening pressure $P_{in}$, in this case a pressure substantially equal to the downstream pressure $P_{out}$ of the working fluid, causing the valve 13 to be kept in a closed configuration.

FIG. 4A shows the electrochemical system 20 in which the supply device 1 is activated. The actuation of the distributor 14 by a user causes the control opening 14.3 to be connected to the first opening 14.1. The valve head 13.1 is then subject to an opening pressure substantially equal to the upstream pressure $P_{in}$ of the working fluid, causing the valve 13 to be opened.

When the supply device 1 ceases to be activated, the distributor 14 returns to the rest state in which the control opening 14.3 is connected to the second opening 14.2. In a transient condition, the working fluid, in contact with the valve head 13.1 at a pressure substantially equal to the upstream pressure $P_{in}$, expands to a pressure substantially equal to the pressure $P_{out}$ and reaches the fluid line 11 downstream of the pressure regulator 12.

Thus the valve 13 is actuated for opening/closing by the distributor 14, using a control fluid which is the working fluid flowing in the fluid line 11. The connection of the second opening 14.2 to the fluid line 11 makes it possible to avoid a loss of working fluid when the valve 13 is closed. The reduction in the energy cost may be considerable, notably when the electrochemical system 20 comprises a plurality of hydrogen or oxygen supply valves which may be actuated regularly during the operation of the fuel cell 21, as described, notably, in patent application EP3109934.

The purge valve 24 is here controlled by the supplementary distributor 25. In a variant, the latter may be absent, so that the distributor 14 simultaneously causes the opening/closing of the valve 13 and of the supplementary valve 24. The purge valve 24 is here similar or identical to the valve 13 described with reference to FIGS. 1A and 1B. It is preferably open when the distributor 25 is not activated, and may be actuated for opening by overpressure or underpressure, as described above. In a variant, it may be closed when the distributor 25 is not activated, and may be actuated for closing by overpressure or underpressure.

The supplementary distributor 25 comprises a first opening 25.1 connected to the fluid line 11 upstream of the pressure regulator 12, a second opening 25.2 connected to the fluid line 11 downstream of the pressure regulator 12, and a control opening 25.3, connected to the head of the purge valve 24. The actuation of the purge valve 24 by the distributor 25 is similar to the operation described above, and is not detailed further here. Thus the actuation of the supplementary valve 24 requires a particularly low energy cost, since use is made of the pressure difference of the working fluid for controlling this valve 24 also.

Figure 4B:
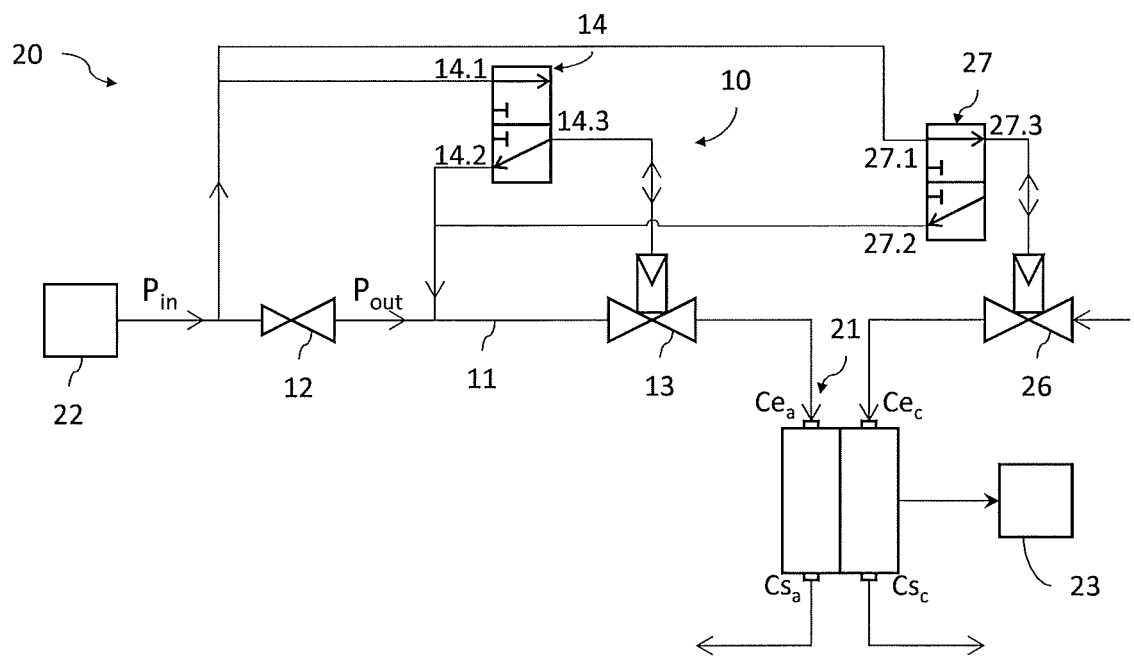
FIG. 4B is a schematic view of another example of an electrochemical system of the fuel cell type comprising a hydrogen fluid supply device according to one embodiment, which also provides control of an air supply valve.

FIG. 4B shows another example of the application of the fluid supply device 10 according to the first embodiment in the context of an electrochemical system 20 having a fuel cell 21. In this example, the supply device 10 is positioned on the anode fluid line and supplies the fuel cell 21 with hydrogen. The fuel cell 21 is supplied with air on the cathode side, and comprises an air supply valve 26, pressure-controlled by a dedicated distributor 27. In a variant, the dedicated distributor 27 may be absent, so that the distributor 14 simultaneously controls the opening/closing of the valve 13 and of the air supply valve 26.

The cathode supply valve 26 is here similar or identical to the anode supply valve 13. It is preferably closed when the distributor 27 is not activated, and may be actuated for opening by overpressure or underpressure, as described above. In a variant, it may be open when the distributor 27 is not activated, and may be actuated for closing by overpressure or underpressure.

The cathode distributor 27 comprises a first opening 27.1 connected to the fluid line 11 upstream of the pressure regulator 12, a second opening 27.2 connected to the fluid line 11 downstream of the pressure regulator 12, and a control opening 27.3 connected to the head of the cathode supply valve 26. The latter is here similar or identical to that described with reference to FIGS. 1A and 1B, and is closed when the distributor 27 is not activated, and can be actuated for opening by overpressure, that is to say when its valve head is subject to a working fluid at the opening pressure, which is substantially equal to the upstream pressure $P_{in}$. The actuation of the cathode supply valve 26 by the distributor 27 is similar to the operation described above, and is not detailed further here. Thus the actuation of the cathode supply valve 26 requires a particularly low energy cost, since use is made of the pressure difference of the working fluid for controlling this valve 26 also.

Particular embodiments have been described above. A range of variants and modifications will be apparent to those skilled in the art. Thus, the various examples described above may be combined, so that the electrochemical system 20 may comprise a plurality of supplementary valves, on both the anode side and the cathode side, pressure-controlled by the working fluid flowing in the fluid line of the fluid supply device 10 according to the first or the second embodiment.

The invention claimed is:

1. A fluidic device for supplying working fluid, comprising:
    a fluid line for the flow of the working fluid, comprising an inlet configured to receive the working fluid at an upstream pressure $P_{in}$;
    a pressure regulator, positioned on the fluid line, configured to reduce the pressure of the working fluid from the upstream pressure to a downstream pressure $P_{out}$; and
    a valve, positioned on the fluid line upstream or downstream of the pressure regulator, comprising a valve head configured to occupy a valve open position and a valve closed position,
    wherein the valve is configured to be pressure-controlled for opening or closing, depending on whether a pressure exerted on the valve head is substantially equal to the upstream pressure $P_{in}$ or to the downstream pressure $P_{out}$,
    wherein the fluidic device comprises a distributor,
    wherein the distributor comprises a first opening connected to the fluid line upstream of the pressure regulator, a second opening connected to the fluid line downstream of the pressure regulator, and a third control opening, connected to the valve head, and
    wherein the distributor is configured to cause the valve to be opened or closed, depending on whether the control opening is connected to the first opening or to the second opening.

2. The fluidic device according to claim 1, wherein the distributor is configured so that the valve is closed when the working fluid exerts a closing pressure, substantially equal to the pressure of the working fluid in the fluid line at the inlet of the valve, on the valve head.

3. The fluidic device according to claim 1, wherein:
    the valve is positioned downstream of the pressure regulator, and is configured to be open when the working fluid exerts a pressure substantially equal to the upstream pressure $P_{in}$ on the valve head, and to be closed when the working fluid exerts a pressure substantially equal to the downstream pressure $P_{out}$ on the valve head, and
    the distributor has:
        a valve opening configuration in which the control opening is connected to the first opening, thus putting the valve head into communication with the working fluid at a pressure substantially equal to the upstream pressure $P_{in}$, and
        a valve closing configuration in which the control opening is connected to the second opening, thus putting the valve head into communication with the working fluid at a pressure substantially equal to the downstream pressure $P_{out}$.

4. The fluidic device according to claim 1, wherein:
    the valve is positioned upstream of the pressure regulator, and is configured to be open when the working fluid exerts a pressure substantially equal to the downstream pressure $P_{out}$ on the valve head, and to be closed when the working fluid exerts a pressure substantially equal to the upstream pressure $P_{in}$ on the valve head, and
    the distributor has:
        a valve opening configuration in which the control opening is connected to the second opening, thus putting the valve head into communication with the working fluid at a pressure substantially equal to the downstream pressure $P_{out}$, and
        a valve closing configuration in which the control opening is connected to the first opening, thus putting the valve head into communication with the working fluid at a pressure substantially equal to the upstream pressure $P_{in}$.

5. The fluidic device according to claim 1, wherein the valve comprises an intermediate chamber, located between the valve head and an internal passage communicating with the fluid line, and traversed in a sealed manner by a rod connecting the valve head to a shutter of the internal passage, the intermediate chamber being set at a pressure substantially equal to the closing pressure.

6. The fluidic device according to claim 5, wherein the intermediate chamber is connected to a part of said fluid line in which the working fluid is at the closing pressure.

7. The fluidic device according to claim 1, wherein the distributor is electrically controlled.

8. An electrochemical system, comprising:
    a tank for storing a working fluid at a pressure greater than or equal to the upstream pressure $P_{in}$;
    a fuel cell, comprising at least one inlet manifold configured to provide the flow of working fluid into the fuel cell; and
    at least one of the fluidic supply device according to claim 1, connecting the tank to the inlet manifold, the working fluid being hydrogen or oxygen.

9. The electrochemical system according to claim 8, comprising:
    at least one supplementary valve,
    wherein the at least one supplementary valve comprises a valve head configured to occupy a valve open position and a valve closed position, and configured to be pressure-controlled for opening or closing, depending on whether a pressure exerted on the valve head is substantially equal to the upstream pressure $P_{in}$ or to the downstream pressure $P_{out}$, and
    wherein the at least one supplementary valve is pressure-controlled by said distributor of said fluidic supply device, or by a supplementary distributor comprising a first opening connected to said fluid line upstream of said pressure regulator, a second opening connected to said fluid line downstream of said pressure regulator, and a third control opening, connected to the head of the supplementary valve, and configured to cause the opening or closing of the supplementary valve, depending on whether its control opening is connected to its first opening or to its second opening.

10. The electrochemical system according to claim 8, wherein:
the working fluid is hydrogen,
the fuel cell comprises an anode inlet manifold configured to receive the working fluid, and a cathode inlet manifold configured to receive air,
at least one air supply valve is positioned on an air fluid supply line connected to the cathode inlet manifold,
the at least one air supply valve comprises a valve head configured to occupy a valve open position and a valve closed position, and configured to be pressure-controlled for opening or closing, depending on whether a pressure exerted on its valve head is substantially equal to the upstream pressure $P_{in}$ or to the downstream pressure $P_{out}$, and
the at least one air supply valve is pressure-controlled by said distributor of said fluidic supply device, or by a distributor for controlling the air supply valve, comprising a first opening connected to said fluid line upstream of said pressure regulator, a second opening connected to said fluid line downstream of said pressure regulator, and a third control opening, connected to the head of the air supply valve, and configured to cause the opening or closing of the air supply valve, depending on whether its control opening is connected to its first opening or to its second opening.

* * * * *